INVENTOR
ROBERT W. VEHLING
JOHN F. GLEICHMAN
BY Herbert R. Kleinman ATTORNEY

United States Patent Office 3,170,293
Patented Feb. 23, 1965

3,170,293
TURBINE ENGINE
Robert W. Vehling, 1202 Schleicher Road, Indianapolis 19, Ind., and John F. Gleichman, 6216 Central Ave., Indianapolis 20, Ind.
Filed Feb. 15, 1962, Ser. No. 173,431
3 Claims. (Cl. 60—39.15)

This invention relates to a turbine engine having a plurality of bladed wheels to be revolved from gases fed from a combustion chamber. It is a characteristic of the invention that a fuel mixture be received in a combustion chamber, compressed, and discharged against the blades of the wheels, which, are so arranged that there is one wheel for each combustion chamber.

It is the primary object of the invention to provide a structure which will be highly efficient in its operation, particularly in respect to its use of fuel, and which will be exceedingly simple in respect to the movement and number of parts.

Furthermore, the design of the engine provides for a lightweight structure wherein there is a maximum power output for each pound of engine weight.

These and many other objects and advantages of the invention will become apparent to those versed in the art in the following description of one particular form of the invention as illustrated in the accompanying drawings, in which FIG. 1 is a view in side elevation and partial section of a structure embodying the invention;

Figure 1:
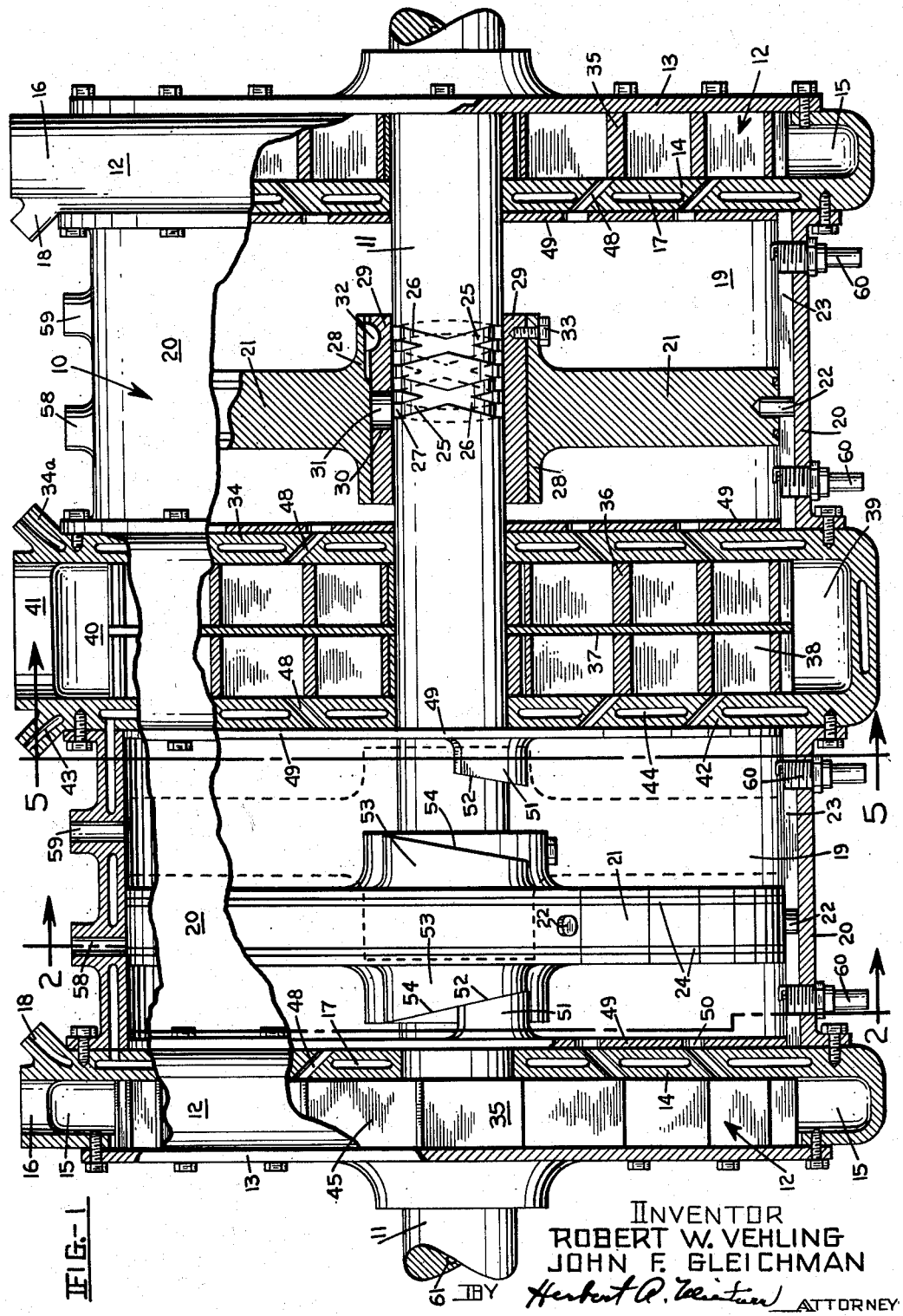

A multi-section housing generally designated by the numeral 10 is provided to carry a central straight shaft 11 therethrough. A turbine wheel compartment generally indicated by the numeral 12 is provided between a front wall 13 and a transverse housing wall 14. Surrounding this chamber 12 is an annular exhaust passageway 15. This passageway discharges at any suitable location therearound, such as through the outlet 16.

The wall 14 is preferably water cooled and has the coolant passageway 17 therearound communicating with an external nipple 18.

Adjacent the wheel chamber 12, is a combustion chamber 19 located within the housing, cylindrical section 20. A piston 21 is carried by the shaft 11 and slidingly bears by its periphery against the internal surface of the housing section 20. The piston 21 is held against rotation in respect to the section 20 by any suitable means, herein shown as by a plurality of pins 22 engaging one each in a longitudinal groove 23 provided across the inside of the section 20. Thus the shaft 11 rotates on its own axis without rotating the piston 21. Preferably the piston 21 is gas sealed such as by piston rings 24, herein shown as two in number encircling the periphery of the piston and bearing against the inside wall of the section 20.

The piston 21 is reciprocated longitudinally of the shaft 11 by the following means. A number of turns of a thread such as the right hand thread 25 is cut around the shaft 11, herein shown as two complete threads. A left hand thread 26, two turns, is cut around the shaft so that there is a continual thread pathway encircling the shaft 11, so that a follower pin inserted in the thread path and carried by the piston 21 will cause the piston 21 to travel back and forth within the limits of travel set up by the two threads.

Figure 3:
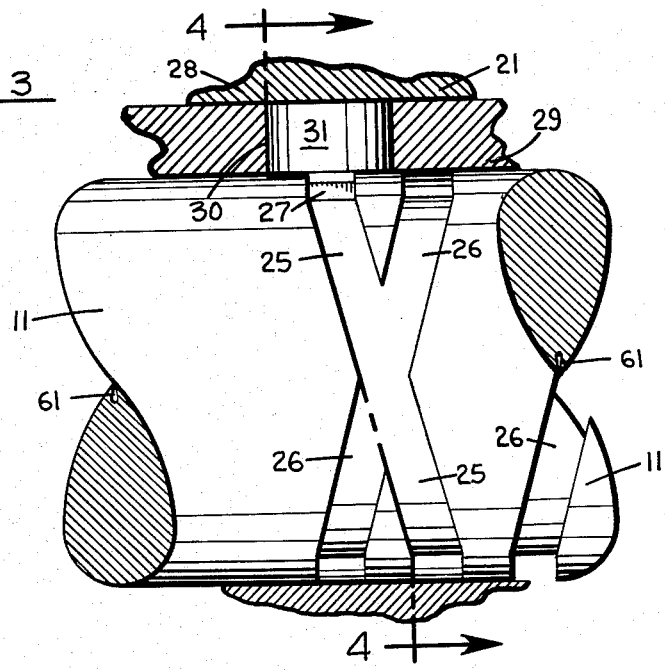
FIG. 3 is a detail on an enlarged scale in longitudinal vertical section of drive means for moving a combustion chamber piston.
Figure 4:
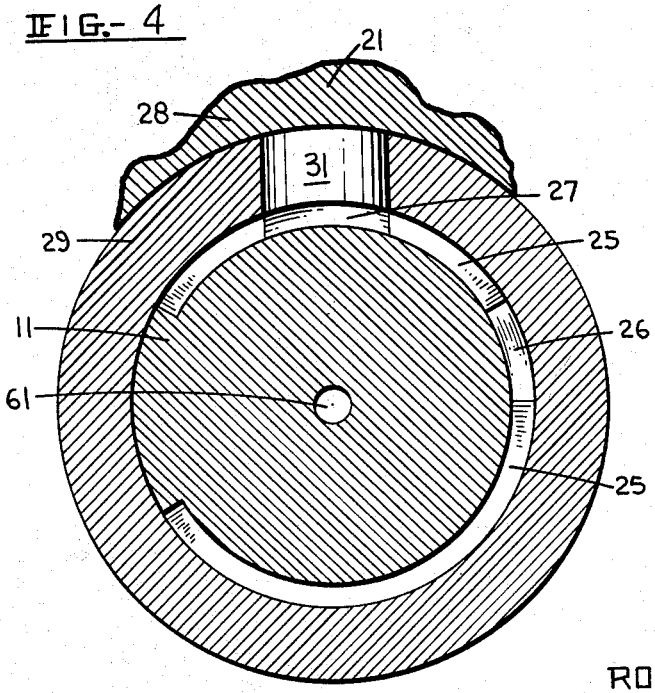
FIG. 4 is a view in transverse vertical section on the line 4—4 in FIG. 3.

Referring to FIGS. 3 and 4, the piston 21 has a hub 28 receiving therein a sleeve 29 which engages about the shaft 11. The sleeve 29 has a hole 30 radially therethrough to receive with a sliding fit a cylindrical head 31 to which a pin 27 is fixed. The radial height of the head 31 is substantially equal to the thickness of the sleeve 29. The sleeve 29 is removably fixed to the hub 28 by any suitable means, herein shown as by means of a key 32 and a setscrew 33.

The turning of the shaft 11 will cause the pin 27 to follow the combined paths of the threads 25 and 26 to reciprocate the piston 21 to and fro across the combustion chamber 19.

Figure 6:
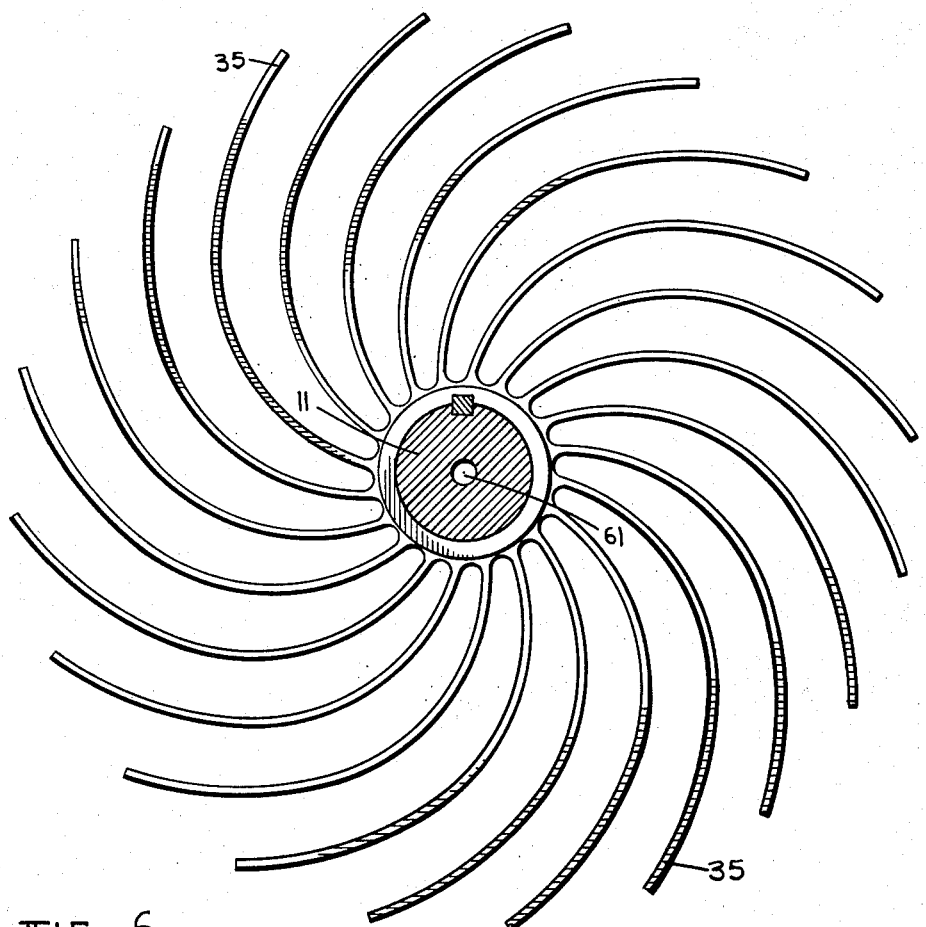
FIG. 6 is a view in side elevation of a turbine wheel.

Next adjacent the combustion chamber 19 is a back wall 34. This back wall 34 is preferably water cooled and the coolant has access thereto through the nipple 34a. In the front chamber 12 is rotatably mounted a turbine wheel 35 of any selected type, herein shown as being of that construction as illustrated in FIG. 6. This wheel 35 is fixed to the shaft 11 to turn therewith with a running fit between the cover plate 13 and the wall 14.

Behind the wall 34 is another turbine wheel designated by the numeral 36, being in fact a pair of wheels integrally interconnected through a center plate or disk 37. This combination wheel comprises the one wheel 36 on the one side of the plate 37 and the other wheel 38 on the back side of the plate 37 open from their peripheral portion into the common exhaust conduit 39 which surrounds the wheels and exhausts through the passageway 40. The passageway 40 in turn exhausts through the ports 41. The two wheels 36 and 38 are fixed to rotate with the shaft 11.

Behind the wheel 38 is an enclosing wall 42, and this wall 42 is preferably water cooled and has access to coolants through the nipple 43 to the wall passageways 44. Behind the wall 34 is another combustion chamber duplicating the forward combustion chamber 19 and being like numbered together with the other remaining assembled parts including the piston 21, the rear combustion wall 14, the rear turbine wheel 45, and a back pivot plate 13. The rear turbine wheel 45 turns with a running fit in the chamber 12 between the wall 14 and the plate 13, and exhausts through the annular passageway 15 discharging through the port 16. The second piston 21 is reciprocated on the shaft 11 in exactly the same manner as was described before in relation to the first or front chamber piston 21.

The walls 14, 34, and 42 each have a plurality of diagonally disposed passageways 48 extending therethrough in the nature of nozzles, flaring outwardly from central zones of the shaft 11 along which the pistons 21 reciprocate. A valve plate in the nature of a disk 49 covers each of these four walls 14, 34, 42, and 14 on the faces thereof exposed within the combustion chambers 19. Each of these disks 49 are substantially of the same diameter as that of the combustion chamber 19, in each instance, and is revolubly mounted on the shaft 11. Each disk 49 has a plurality of orifices 50 therethrough, one in number for each of the nozzles 48, and arranged to register respectively therewith upon suitable rotation of the disk, registration being shown in FIG. 1.

Figure 2:
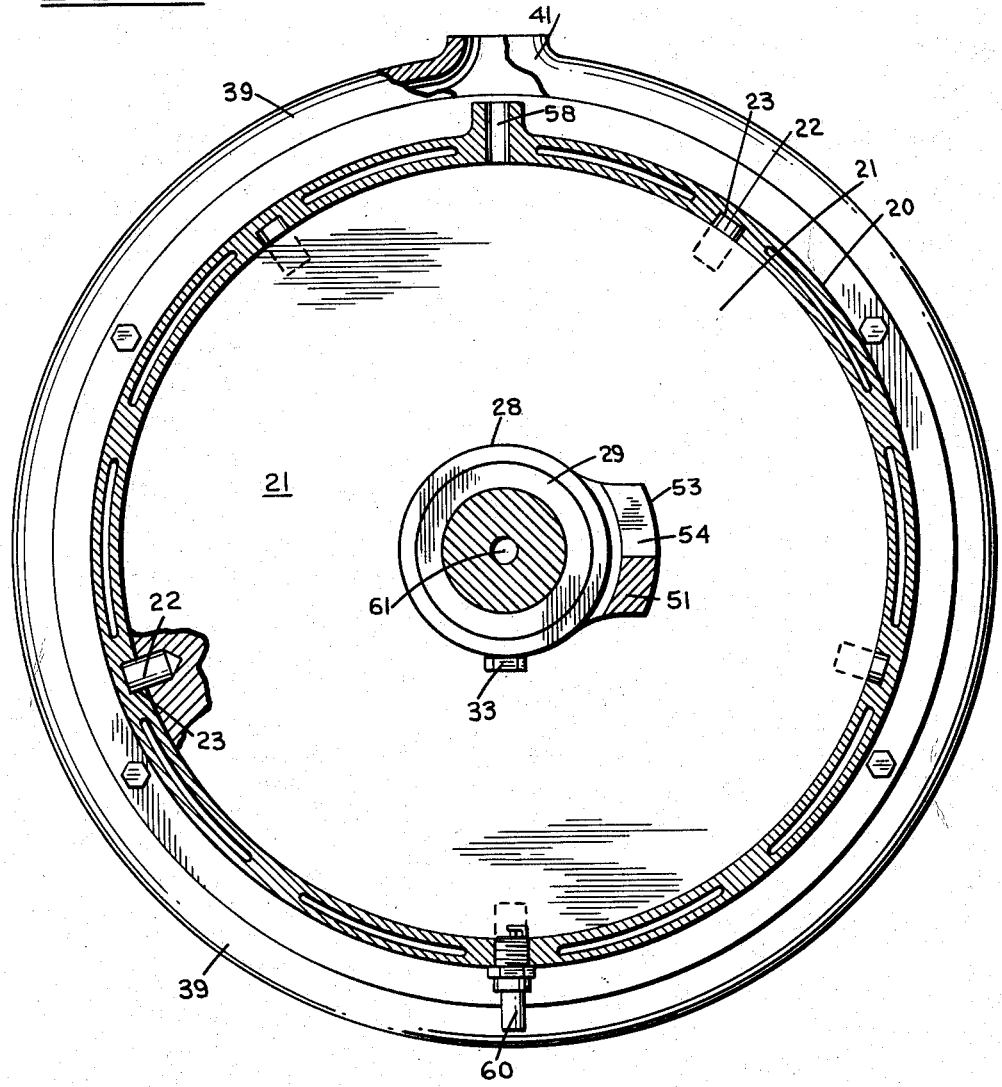
FIG. 2 is a view in vertical, transverse section on the line 2—2 in FIG. 1.

Rotation of each of the disks 49 is had by means of a camming action operated by travel of the pistons 21 in each instance. The structure for this action is best illustrated in FIGS. 1 and 2. A post 51 is fixed on the disk 49 and has an inclined face 52 presented toward the piston 21. The piston also has a member 53 fixed to it with an inclined face 54 in the path of the face 52. Viewing the piston 21, left hand side combustion chamber 19 as viewed in FIG. 1, the piston has traveled along the shaft 11 from the contact of the face 54 with the face 52 on the right hand side to bring the respective faces 52 and 54 on the left hand side of the piston into contact, and through a wedging action rotated the disk 49 from an orifice-nozzle non-registry position to the intercommunicating position in each instance as indicated in FIG. 5.

Figure 5:
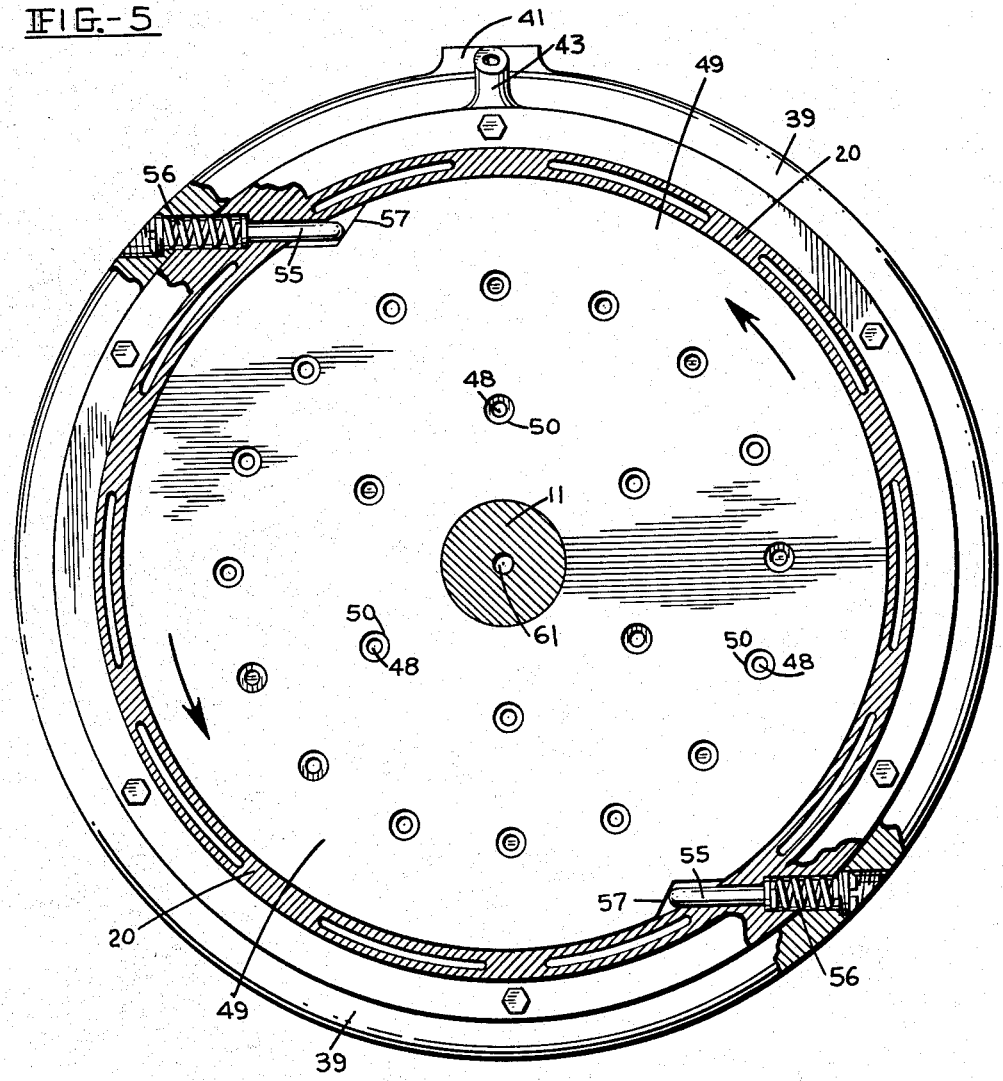
FIG. 5 is a view in vertical transverse section on the line 5—5 in FIG. 1.

In so traveling, the disk 49 has turned around the shaft 11 against the plungers 55, two in number in the present showing, FIG. 5, which are normally spring urged by the springs 56 against an inclined surface 57 entering the periphery of the disk on opposite sides. When the piston 21 reverses its travel from the left hand position and goes to the dash line position as indicated in FIG. 1, the disk 49 is returned to its non-registry position by means of the springs 56. The disks 49 thus remain in their "closed" or non-registry positions until the piston 21 in each instance travels sufficiently far to again shift the disks in the directions indicated by the arrows in FIG. 5.

Each combustion chamber 19 has a pair of spaced apart fuel mixture injection tubes 58 and 59 respectively. A fuel injection system (not shown) is employed to open and close these tubes 58 and 59 in timed relation with travel of the pistons 21. The piston 21 in each instance will close off these tubes 58 and 59 from their inner sides within the combustion chambers by overlapping the inner ends of the tubes as indicated in FIG. 1, left hand side. This closing off of the one tube at a time occurs approximately at the time of ignition of the fuel between the piston and the wall 14, for example, or the piston 21 and the wall 42 on the other side in the left hand combustion chamber, the same thing occurring in the right hand combustion chamber 19. There is some ignition means such as a spark plug 60 entered through the side wall of each of the combustion chambers 19, and as herein shown, one spark plug toward each end of each combustion chamber so that the spark plugs are not overrun by travel of the piston 21 in either case.

No means for lubrication has been shown with the exception that the main shaft 11 is centrally bored to have an oil passageway 61 from which oil will bleed to the thread means employed to induce travel of the pistons, and also possibly to internal cavities within the pistons (not shown). The lubrication system is within the knowledge of any engineer working in this particular field.

Therefore it is to be seen that I have presented my invention in a form which is quite simple and yet most effective. Intermixed combustion gaseous fuel is injected in timed relation with the travel of the pistons 21 onto either side of those pistons as would be in accordance with the timing so that the gases are introduced when the greatest possible volume is to be had on one side of the piston and its adjacent wall, and then upon travel of the piston, those gases are compressed between the piston and the opposite wall in the same combustion chamber and at the peak of compression ignited and discharged through the disk orifices 50 and nozzles 48 into the blading of the respective wheels.

It is required that this engine will have to be started externally by rotating the shaft 11 by any suitable means such as by the well known electric starting motor system. The several rotors will serve to give a combined flywheel effect.

While I have herein shown and described my invention in the one particular form, in more or less minute detail, it is obvious that structural changes may be employed without departing from the spirit of the invention, and I therefore do not desire to be limited to that precise form beyond the limitations which may be imposed by the following claims.

I claim:
1. An engine having a
   turbine wheel chamber;
   an axial combustion chamber;
   a wall between the turbine and combustion chambers;
   a shaft rotatably extending through said wall and said chambers;
   a turbine wheel fixed on said shaft in said turbine chamber;
   a piston mounted on and shiftable longitudinally along said shaft within said combustion chamber;
      means holding said piston against rotation in said combustion chamber;
   means reciprocating said piston along the shaft upon rotation of the shaft;
   said wall having nozzle passageways through it communicating between said two chambers and directed toward said wheel;
   a disc valve member rotatable about the axis of said shaft adjacent said wall and having openings therethrough registering with and opening and closing said passageways upon rotary travel of the disc;
   cam means actuated by travel of said piston rotating said disc member effecting said passageway opening and closing;
   a fuel inlet orifice in the wall of said combustion chamber to one side of the center of travel of said piston;
      and said orifice being covered by said piston upon the piston approaching its limit of travel toward said disc member.
2. The structure of claim 1 in which
   said turbine wheel chamber is at one end of said combustion chamber;
      and there is
   a second turbine wheel chamber at the opposite end of the combustion chamber;
   said shaft extends into said second turbine wheel chamber;
   a second turbine wheel fixed to said shaft in said second wheel chamber;
   a wall between the combustion chamber and the second wheel chamber and having nozzle passageways therethrough;
   a second disc valve member controlling gas flow through the second wall passageways; and
   second means actuated by travel of the piston toward the second wall actuating said second valve member; and
   means admitting fuel to said combustion chamber to the other side of said piston.
3. The structure of claim 1, in which
   said wall between the turbine and said combustion chamber has coolant passageways therethrough; and
   said disc valve member is in running fit against said wall.

References Cited in the file of this patent
UNITED STATES PATENTS

| | | |
|---|---|---|
| 1,445,337 | Mackle | Feb. 13, 1923 |
| 2,500,860 | Penn | Mar. 14, 1950 |
| 2,705,592 | Reiser | Apr. 5, 1955 |
| 3,068,639 | Benoit | Dec. 18, 1962 |